Figure 1:
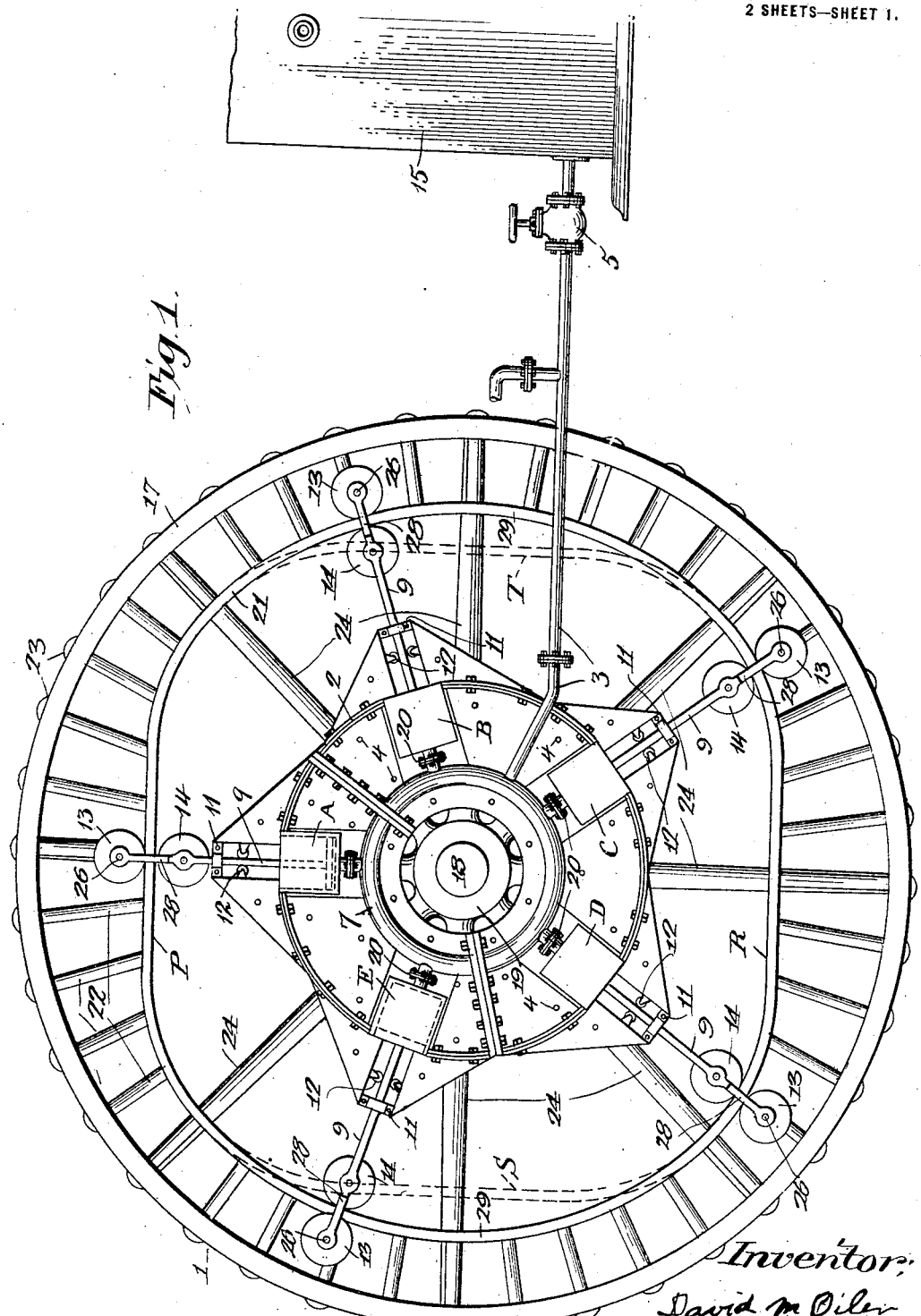

D. M. OILER, Sr.
CAM ACTUATED PUMP.
APPLICATION FILED OCT. 2, 1916.

1,236,863.

Patented Aug. 14, 1917.
2 SHEETS—SHEET 1.

Inventor:
David M Oiler Sr

UNITED STATES PATENT OFFICE.

DAVID M. OILER, SR., OF BRADDOCK BOROUGH, PENNSYLVANIA.

CAM-ACTUATED PUMP.

1,236,863.  Specification of Letters Patent.  Patented Aug. 14, 1917.

Application filed October 2, 1916. Serial No. 123,272.

*To all whom it may concern:*

Be it known that I, DAVID M. OILER, Sr., a citizen of the United States, residing at Braddock borough, county of Allegheny, State of Pennsylvania, have invented certain new and useful Improvements in Cam-Actuated Pumps, of which the following is a specification.

This invention relates to certain new and useful improvements in cam actuated pumps.

The primary object of the invention is the provision of an attachment which may be readily installed upon a driven wheel such as a belt or fly wheel of an engine adapted for service as an air compressor or other similar devices.

A further object of the device is the provision of a means which is simple and inexpensive to manufacture and adapted to be utilized in conjunction with a moving part of an engine whereby the movement of said part may be utilized with only a slight expenditure or loss of energy.

A still further object of the invention is the provision of a device serviceable with any form of engine for compressing air in an economic manner, the device being capable of employment in multiple in different desired relations with respect to a wheel of a motor engine.

With these general objects in view and others that will appear as the nature of the invention is better understood, the same consists in the novel construction, combination and arrangement of parts hereinafter fully described, illustrated in the accompanying drawing and pointed out in the appended claims.

Figure 2:
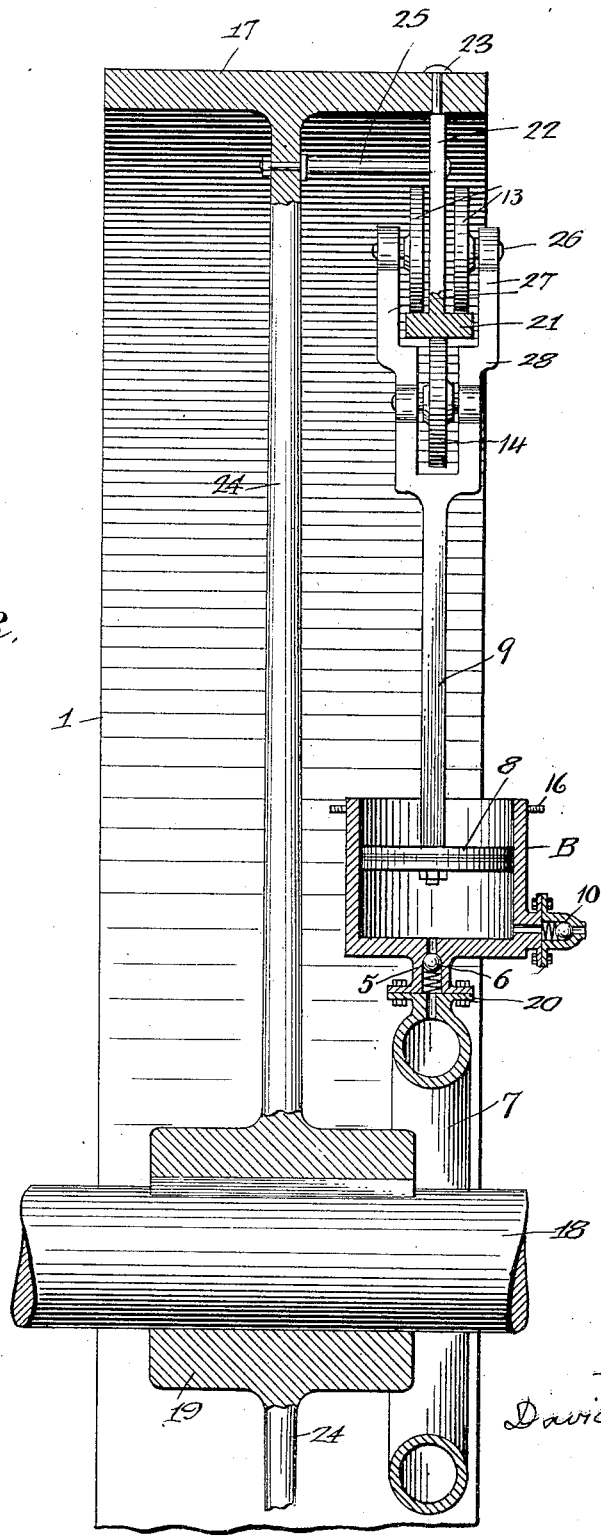

In the drawings forming a part of this application and in which like numerals refer to corresponding parts throughout the several views;

Figure 1 is a side elevation of the device operatively arranged in connection with a fly wheel, and, Fig. 2 is an enlarged diametrical sectional view through a portion thereof with the mounting frame removed.

Referring more in detail to the drawings, it will be understood that the device is adaptable for employment with different forms of driving or driven wheels, but is specially serviceable as a power adjunct or attachment to the fly wheel, such as 1 of an ordinary stationary engine.

A frame 2 is mounted in any desired manner stationary within the annular rim 17 of the said wheel and having a receiving annulus 7 centrally arranged thereon and positioned concentric with the shaft 18 upon which the hub 19 of the wheel 1 is fixedly keyed. The frame 2 may be mounted upon posts or standards, not shown, or in any other convenient manner, it being not desired to limit myself to any specific form of mount for securing the frame 2 in a stationary position. An air receiver or reservoir 15 is arranged at any desired distance from the annulus 7 being in connection therewith by means of a connecting pipe 3 provided with a suitable controlling valve 5.

A plurality of air compressors are radially arranged outwardly of the receiving annulus 7 herein illustrated as comprising cylinders A, B, C, D, and E connected to the receiving annulus by suitable connections 20, valves 5 being arranged at the bottoms of said cylinders provided with spring seated balls 6 unseating for opening in a direction toward the receiving annulus. An air inlet valve 10 is provided upon the side of each of the said cylinders normally arranged closed.

The compressor cylinders are secured to the frame 2 in any desired manner as by the connectors 16 attached to the webs 4 of the frame while pistons 8 are slidably arranged within the said cylinders having operating rods 9 arranged radially of the wheel 1. A cam track 21 is hingedly secured to the wheel rim 17 inwardly thereof and surrounding the frame 2 by means of a plurality of posts 22 arranged radially of the wheel 1 and having their outer ends secured through the rim 17 as at 23. The posts which lie adjacent and parallel with the spokes 24 of the wheel 1 are rigidly connected thereto by means of arms 25, the track 21 being fixed to the wheel 1 in this manner for revolving therewith.

The track 21 is an endless track and the posts 22 being connected at their inner ends centrally of the track, provides opposite side portions upon which wheels 13 are positioned between the said track 21 and the rim 17, the said wheels being journaled as at 26 to the side arms 27 of a harp 28 forming an outer extension of the piston rod 9, the track 21 being positioned between the said arms 27. It will be understood that the piston rod 9 of each of the compressor cylinders is arranged with a similar harp and wheel construction. Each of the harps 28 is also arranged with a wheel 14 inwardly of the wheels 13 thereof for bearing centrally upon the inner face of the track 21.

Guides 11 are carried by the frame 2 through which the rods 9 are slidably arranged while pairs of guide rollers 12 are also carried by the frame adjacent the guides 11 for the sliding reception of the adjacent piston rod 9 therebetween. The track 21 has diametrically opposite arcuate portions 29 of substantially 90° are arranged parallel with the rim 17 and upon which portions the wheels 13 and 14 are positioned when the pistons 8 are projected or positioned at the outward extremity of their strokes. Opposite flattened cam portions P and R are arranged intermediate the arcuate portions 29 of the track 21 and being positioned nearer the axis of the wheel shaft 18, the said cam portions bear upon the wheels 14 moving the harps 28 inwardly and thereby depressing the pistons 8 within the compressor cylinders.

The complete operation of the device will be apparent from this detail description thereof, it being seen that the revolving of the wheel 1 alternately retracts inwardly or depresses the piston 8 by contacting the cam portions P and R of the track with the inner wheels 14 while the pistons 8 are projected or moved outwardly within the compressor cylinders by the engagement of the outer wheels 13 with the remaining intermediate portions of the track 21. The outward movements of the piston 8 draw air into the cylinders through the intake valves 10 while the inward movements of the pistons 8 compress the air within the cylinders forces the same through the check valves 5 into the receiving annulus 7 and from thence through the pipe 3 to the reservoir 15.

It will be understood that any desired number of compressors may be so arranged in connection with the frame 2 and the wheel 1 while the device so shown upon one side of the wheel may be employed upon the other side thereof if found desirable, either one or two of the devices being arranged upon a single wheel. When separate devices are arranged upon opposite sides of the same wheel the cam portions of the track 21 may be arranged at intermediate points with respect to the wheel 1, the positions of the cam portions of a track being illustrated by dotted lines in Fig. 1 of the drawings at S and T arranged upon the opposite side of the wheel from the track 21 having the cam portions P and R.

A serviceable air pump or compressor is arranged which may be readily mounted stationary adjacent a fly wheel and when associated with the wheel in the manner herein set forth will operate to supply compressed air simultaneously with the operation of the engine or motor with which the wheel 1 is provided. The embodiment of the device as herein illustrated is believed to be preferable, but it will be understood that such changes may be made therein if found desirable which do not depart from the spirit and scope of the invention as claimed.

What I claim as new is:—

1. A device of the class described comprising in combination with a fly wheel, an endless track mounted within the rim of the wheel having arcuate portions parallel with the rim and intermediate depressed cam portions, fixedly mounted cylinders arranged adjacent the wheel, reciprocating pistons within the said cylinders operatively associated with the opposite faces of said track and radially positioning guide means for said pistons.

2. A device of the class described comprising in combination with a fly wheel, an endless track mounted within the rim of the wheel having arcuate portions parallel with the rim and intermediate depressed cam portions, fixedly mounted cylinders arranged adjacent the wheel, pistons within the said cylinders, operating rods carried by said pistons having harps overlying the said track, pairs of wheels journaled in the free ends of said harps arranged upon the outer face of the track and single wheels journaled in said harps in normal contact centrally with the inner face of the track.

In testimony whereof I have affixed my signature.

DAVID M. OILER, Sr. [L. S.]

Witnesses:
JAMES B. DALE,
HARRY C. HARRIS.

Copies of this patent may be obtained for five cents each, by addressing the "Commissioner of Patents. Washington, D. C."